United States Patent
Nielsen et al.

(10) Patent No.: US 10,914,287 B2
(45) Date of Patent: Feb. 9, 2021

(54) METHOD OF OPERATING WIND TURBINE BASED ON MAXIMUM THRUST LIMIT

(71) Applicant: VESTAS WIND SYSTEMS A/S, Aarhus N (DK)

(72) Inventors: Anders Steen Nielsen, Højbjerg (DK); Kasper Zinck, Flemming (DK); Gnana Sekaran, Chennai (IN)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 16/732,459

(22) Filed: Jan. 2, 2020

(65) Prior Publication Data
US 2020/0208610 A1 Jul. 2, 2020

(30) Foreign Application Priority Data
Jan. 2, 2019 (DK) ................................. 2019 70001

(51) Int. Cl.
*F03D 7/04* (2006.01)
*G05B 15/02* (2006.01)
(Continued)

(52) U.S. Cl.
CPC ........... *F03D 7/0292* (2013.01); *F03D 7/045* (2013.01); *F03D 7/046* (2013.01); *F03D 17/00* (2016.05);
(Continued)

(58) Field of Classification Search
None
See application file for complete search history.

(56) References Cited

U.S. PATENT DOCUMENTS

| 2011/0123331 A1* | 5/2011 | Stiesdal | F03D 7/043 416/1 |
| 2013/0161955 A1* | 6/2013 | Dalsgaard | F03D 7/042 290/44 |

(Continued)

FOREIGN PATENT DOCUMENTS

| EP | 2799711 A1 | 11/2014 |
| EP | 2927486 A1 | 10/2015 |
| WO | 2018233787 A1 | 12/2018 |

OTHER PUBLICATIONS

Abdallah et al., "Influence of the control system on wind turbine loads during power production in extreme turbulence: Structural reliabilty," Renewable Energy, 2016, 14 pages.
(Continued)

*Primary Examiner* — Jason Lin
(74) *Attorney, Agent, or Firm* — Patterson + Sheridan, LLP

(57) ABSTRACT

A method of operating a wind turbine having a rotor. Sensor data is received from one or more sensors of the wind turbine and maximum load values are obtained on the basis of the sensor data. The maximum load values are indicative of maximum loads acting on a component of the wind turbine such as a rotor blade. An estimated extreme load value, such as a 50-year return load, is obtained on the basis of the maximum load values and compared with a reference value. A maximum thrust limit is set on the basis of the comparison, and the wind turbine is operated in accordance with the maximum thrust limit so that a wind thrust force acting on the rotor does not exceed the maximum thrust limit.

20 Claims, 4 Drawing Sheets

(51) Int. Cl.
  *F03D 7/02* (2006.01)
  *F03D 17/00* (2016.01)
(52) U.S. Cl.
  CPC ........ *G05B 15/02* (2013.01); *F05B 2270/331* (2013.01); *F05B 2270/332* (2013.01); *F05B 2270/404* (2013.01)

(56) References Cited

U.S. PATENT DOCUMENTS

2014/0248123 A1* 9/2014 Turner .................. F03D 7/0292
  415/1
2014/0288855 A1* 9/2014 Deshpande ........... F03D 7/0292
  702/34
2014/0363292 A1* 12/2014 Thomsen .................. F03D 7/04
  416/1

OTHER PUBLICATIONS

Danish Patent and Trademark Office 1st Technical Examination for Application No. 2019P0001DK KH dated Aug. 23, 2019.

* cited by examiner

METHOD OF OPERATING WIND TURBINE BASED ON MAXIMUM THRUST LIMIT

FIELD OF THE INVENTION

The present invention relates to a method of operating a wind turbine in which a maximum thrust limit is used to limit a wind thrust force acting on a rotor of the wind turbine.

BACKGROUND OF THE INVENTION

EP2799711 discloses a method of operating a wind turbine having a rotor with a plurality of blades, a system for determining one or more loads on the wind turbine, a historical register of data on the wind turbine operation, and a control system for controlling one or more operational parameters of the wind turbine. The method comprises determining the loads on the wind turbine, and storing the determined loads on the wind turbine in the historical register. The method further comprises obtaining, from the historical register, a characteristic indicative of the loads on the wind turbine accumulated over time, and determining one or more wind thrust limits depending on the obtained characteristic indicative of the loads accumulated over time. One or more operational parameters of the wind turbine are controlled to keep the wind thrust on the wind turbine within the determined wind thrust limit.

SUMMARY OF THE INVENTION

A first aspect of the invention provides a method of operating a wind turbine having a rotor, the method comprising: receiving sensor data from one or more sensors of the wind turbine; obtaining maximum load values on the basis of the sensor data, wherein the maximum load values are indicative of maximum loads acting on a component of the wind turbine; obtaining an estimated extreme load value on the basis of the maximum load values; comparing the estimated extreme load value with a reference value; setting a maximum thrust limit on the basis of the comparison; and operating the wind turbine in accordance with the maximum thrust limit so that a wind thrust force acting on the rotor does not exceed the maximum thrust limit.

The present invention sets the maximum thrust limit on the basis of an estimated extreme load value, rather than a characteristic indicative of the loads accumulated over time as in EP2799711.

Optionally the component of the wind turbine is a blade of the rotor, and the maximum load values are indicative of maximum forces or moments acting on the blade of the rotor in a flap-wise direction, for instance measured by a load sensor in the blade. Alternatively the maximum load values may be indicative of maximum loads acting on another component such as the rotor, or a tower carrying a rotor-nacelle assembly.

Optionally the component of the wind turbine load is a blade of the rotor, and the estimated extreme load value is indicative of an estimated force or moment acting on the blade of the rotor in a flap-wise direction. Alternatively the estimated extreme load value may be indicative of an extreme load acting on another component such as the rotor, or a tower carrying a rotor-nacelle assembly.

Optionally each maximum load value is indicative of the highest load acting on a component of the wind turbine during a respective interval, such as a 10 minute interval or an interval of any other duration.

The estimated extreme load value may be indicative of an estimated extreme load acting on the component of the wind turbine, or on another component of the wind turbine. For example the maximum load values and the estimated extreme load value may both be blade load values, or the maximum load values may be blade load values whereas the estimated extreme load value may be a thrust force value indicative of a wind thrust force acting on another component such as the rotor, or a tower carrying a rotor-nacelle assembly.

Optionally the estimated extreme load value is obtained by a statistical analysis of the maximum load values, for instance by extrapolation, by an analysis based on a Gumbel distribution, or by operation of a surrogate model.

Optionally the estimated extreme load value is a return load value indicative of a load with an estimated return period of a given duration, for instance a duration of 50 years or any other given duration such as 30 or 40 years.

Optionally the reference value is obtained by simulation, for instance by running a wind turbine analysis on the basis of a turbine model and climate data.

Optionally comparing the estimated extreme load value with the reference value comprises obtaining a ratio between the estimated extreme load value and the reference value; and setting the maximum thrust limit on the basis of the comparison comprises setting the maximum thrust limit on the basis of the ratio. The ratio may be a simple ratio of the two values, or it may include a safety factor.

Preferably each maximum load value and/or the estimated extreme load value is indicative of an instantaneous magnitude of a force or moment, such as a blade bending moment.

A further aspect of the invention provides a wind turbine or wind turbine control system configured to perform the method of the first aspect.

BRIEF DESCRIPTION OF THE DRAWINGS

Embodiments of the invention will now be described with reference to the accompanying drawings, in which.

DETAILED DESCRIPTION OF EMBODIMENT(S)

Figure 1:
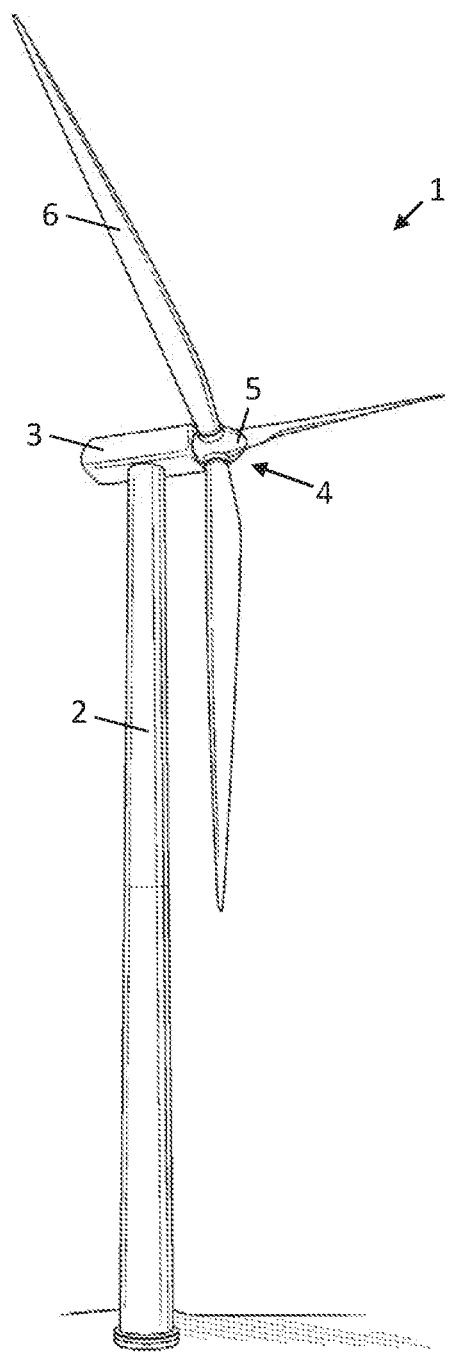
FIG. 1 shows a wind turbine.
Figure 2:
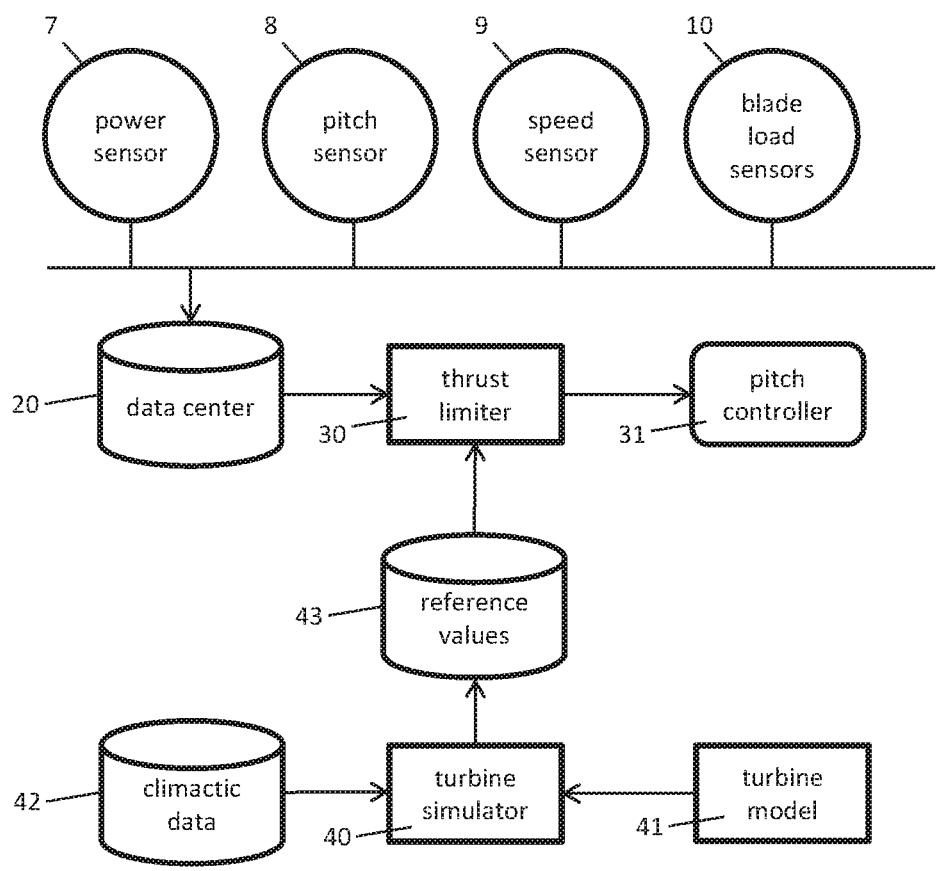
FIG. 2 is a schematic diagram showing a wind turbine control system for controlling the operation of the wind turbine of FIG. 1.
Figure 3:
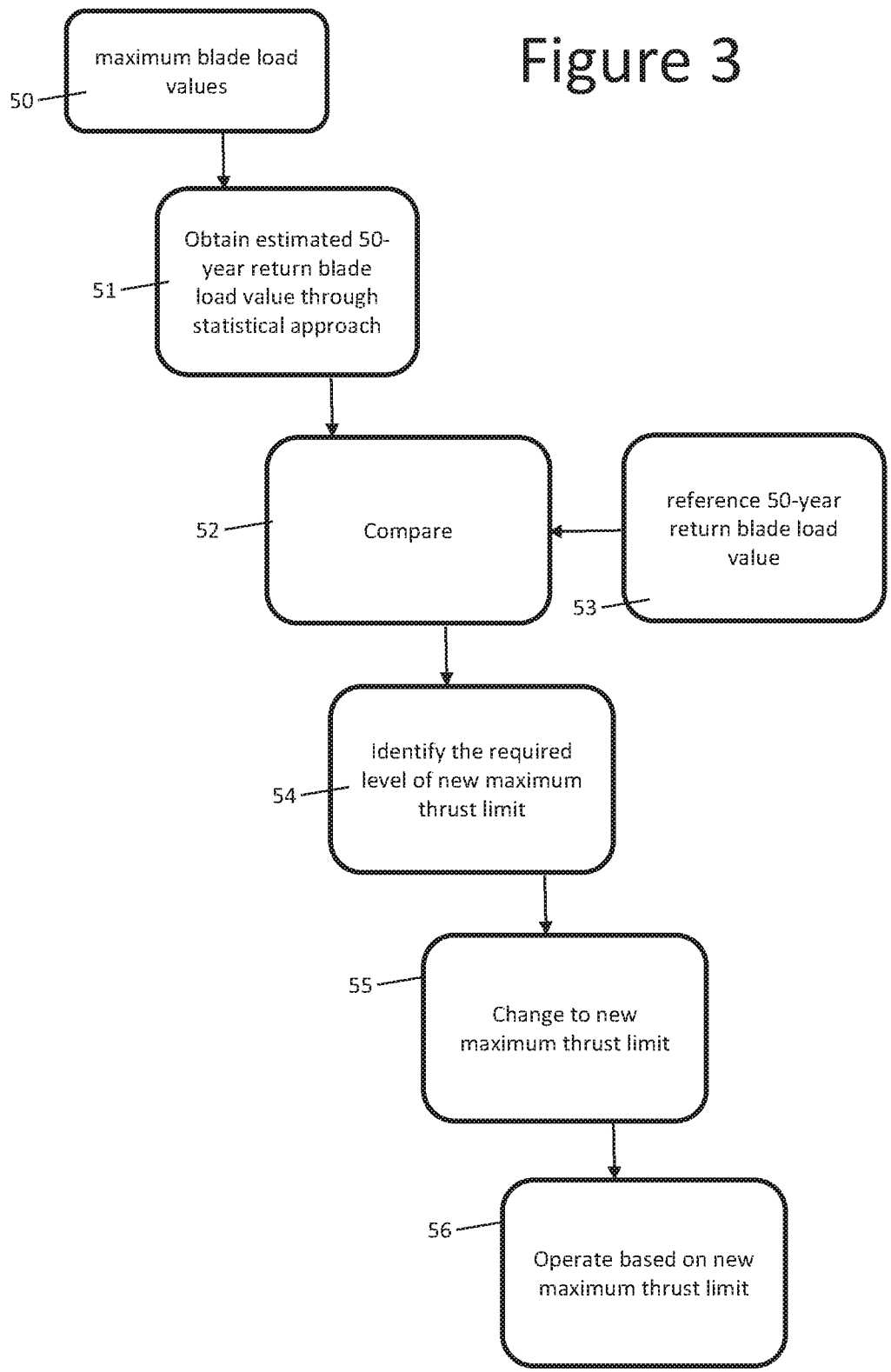
FIG. 3 shows a method of operating the wind turbine of FIG. 1.
Figure 4:
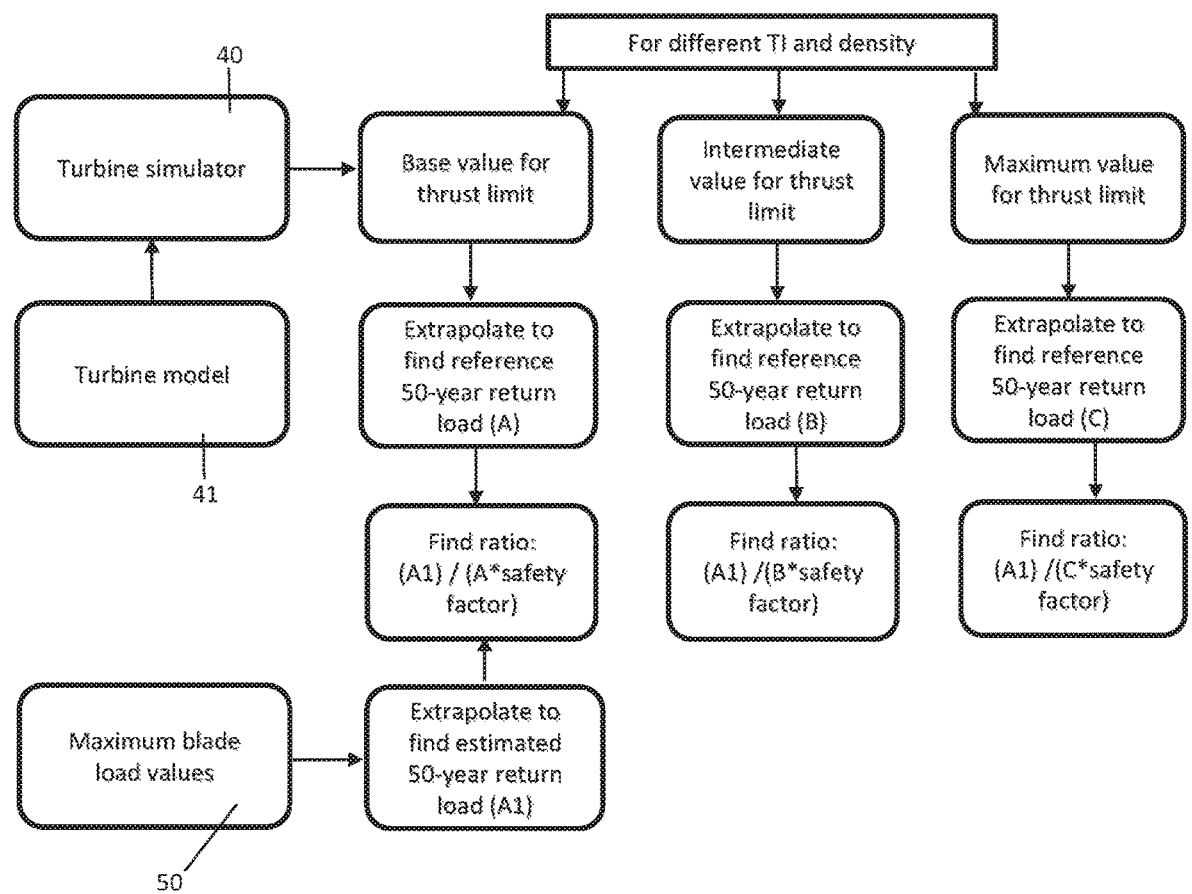
FIG. 4 shows an alternative method of operating the wind turbine of FIG. 1.

FIG. 1 shows a wind turbine 1, and FIG. 2 shows a wind turbine control system configured to control the wind turbine 1 by performing the method shown in FIG. 3 or FIG. 4.

The wind turbine 1 includes a tower 2 mounted on a foundation; and a rotor-nacelle assembly 3, 4 at the apex of the tower 2. The wind turbine 1 depicted here is an onshore wind turbine such that the foundation is embedded in the ground, but the wind turbine 1 could be an offshore installation in which case the foundation would be provided by a suitable marine platform.

A rotor 4 is operatively coupled via a gearbox to a generator housed inside the nacelle 3. The rotor 4 includes a central hub 5 and a plurality of rotor blades 6, which project outwardly from the central hub 5. It will be noted that the wind turbine 1 is the common type of horizontal axis wind turbine (HAWT) such that the rotor 4 is mounted at the nacelle 3 to rotate about a substantially horizontal axis defined at the centre of the hub 5. While the example shown in FIG. 1 has three blades, it will be realised by the skilled person that other numbers of blades are possible.

When wind blows against the wind turbine 1, the blades 6 generate a lift force which causes the rotor 4 to rotate, which in turn causes the rotation of components within a drive train in order to allow a generator within the nacelle 3 to generate electrical energy.

The wind turbine 1 has various sensors shown in FIG. 2, including a power sensor 7 measuring power generated by the generator, a pitch sensor 8 measuring a pitch angle of the blades 6, a speed sensor 9 measuring a rotation speed of the rotor 4, and blade load sensors 10 each measuring a bending moment (in kNm) acting on a respective blade 6 in a flap-wise direction.

The sensors 7-10 generate sensor data. The sensor data from each sensor may be a time series of data values—for instance one value per second. The sensor data may be analyzed over 10 minute intervals to obtain for each 10 minute interval a maximum data value (the highest data value in the interval), a minimum data value (the lowest data value in the interval) and a standard deviation. The maximum data values, minimum data values and standard deviations are recorded in the data center 20, optionally along with the sensor data.

The maximum data values associated with the blade load sensors 10 are referred to below as maximum blade load values. Each maximum blade load value is indicative of the highest bending moment (in kNm) acting on a respective blade of the rotor in a flap-wise direction (that is—a direction out of the rotor plane) for a given 10 minute interval. Thus each maximum blade load value is indicative of an instantaneous magnitude of the flap-wise bending moment at a particular point within the 10 minute interval.

A thrust limiter 30 operates the wind turbine in accordance with a maximum thrust limit so that a wind thrust force acting on the rotor 4 does not exceed the maximum thrust limit. Specifically, the thrust limiter 30 adjusts a pitch angle of the blades 6 via a pitch controller 31 as the wind thrust force approaches the maximum thrust limit to avoid exceeding the maximum thrust limit. The wind thrust force may be estimated from the wind speed, the blade pitch angle and the rotor or generator rotational speed. The maximum thrust limit may be calculated from the wind speed and the blade load standard deviation.

A turbine simulator 40 runs a set of simulations based on a wind turbine model 41 and a historical set of climate data 42 associated with the site of the wind turbine. The output of each simulation is a reference 50-year return load value which is stored in a database 43.

Some elements of the control system of FIG. 1 (for instance the sensors 7-10, thrust limiter 20 and pitch controller 31) may be part of the wind turbine 1, whereas others (for example the data center 20 and the turbine simulator 40) may be located remotely from the wind turbine 1.

Each simulation is based on a respective maximum thrust limit. Table 1 below gives an example in which the turbine simulator 40 runs four simulations, each based on a respective thrust limit value. Each simulation generates a set of simulated maximum blade load values on the basis of the wind turbine model 41 and the historical set of weather data 42, then uses the simulated maximum blade load values to obtain a reference 50-year return load value by extrapolation or Gumbel analysis which is shown in Table 1. The reference 50-year return load value is an extreme load value indicative of the magnitude of a blade load with an estimated return period of 50 years. In this case the thrust limit value of 300 N is associated with a reference 50-year return load of 1000 knM, and the thrust limit value of 320 N is associated with a reference 50-year return load of 1200 knM. Table 1 also includes an estimated 50-year return load which will be explained later.

TABLE 1

| Maximum thrust limit | 300N | 320N | 340N | 360N |
|---|---|---|---|---|
| Reference 50-year return load | 1000 kNm | 1200 kNM | 1400 knM | 1600 knM |
| Estimated 50-year return load | 600 kNm | | | |

The thrust limiter 30 is configured to adjust the maximum thrust limit by the method of FIG. 3. In a first operating period (say 1000 minutes) the thrust limiter 30 operates the wind turbine in accordance with the lowest maximum thrust limit—in the example of Table 1 this is 300 N.

Blade load data is acquired during the first operating period and stored in the data center 20 along with the 100 measured maximum blade load values for that operating period. The measured maximum blade load values 50 are then used to obtain an estimated 50-year return load value in step 51 by a statistical approach such as extrapolation or Gumbel analysis. The estimated 50-year return load value is an extreme load value indicative of the magnitude of a blade load with an estimated return period of 50 years.

In the example above the first operating period is relatively short (1000 minutes) but if necessary to establish an accurate estimation of 50-year return load the first operating period may be much longer, potentially one or more years long.

In step 52 the estimated 50-year return load value obtained in step 51 is compared with a reference 50-year return load value 53 from the database 43 which has been obtained by simulation with the same maximum thrust limit. The simulations may be run offline by the turbine simulator 40, before the wind turbine 1 is operated and before the method of FIG. 3 is performed.

In step 54 a new maximum thrust limit is identified on the basis of the comparison in step 52. For example if the estimated 50-year return load value is less than the reference 50-year return load value then the maximum thrust limit may be increased, and if the estimated 50-year return load value is greater than the reference 50-year return load value then the maximum thrust limit may be decreased.

Also the estimated 50-year return load value may be compared in step 52 with a design limit reference value. If the estimated 50-year return load value is less than both the reference 50-year return load value and the design limit reference value then the maximum thrust limit may be increased. If the estimated 50-year return load value is greater than the design limit reference value then the maximum thrust limit may be decreased.

In step 55 the new maximum thrust limit is changed in the thrust limiter 30, so that during a subsequent operating period indicated at 56 the wind turbine is operated so that a wind thrust force acting on the rotor does not exceed the new maximum thrust limit.

In the case of Table 1, the estimated 50-year return load value is 600 knM, which is less than the reference 50-year return load value so the maximum thrust limit is increased to 340 N for the subsequent operating period. For the subsequent operating period the estimated 50-year return load value increases to 1300 knM as shown in Table 2 below.

TABLE 2

| Maximum thrust limit | 300N | 320N | 340N | 360N |
|---|---|---|---|---|
| Reference 50-year return load | 1000 kNm | 1200 kNM | 1400 knM | 1600 knM |
| Estimated 50-year return load | | | 1300 knM | |

By increasing the maximum thrust limit in the controller, the power performance of the turbine can be improved in the subsequent operating period without exposing the blades to excessive and potentially damaging bending loads.

Note that the thrust limits and loads shown in Tables 1 and 2 are purely for illustrative purposes, and the actual values may differ from those shown.

FIG. 4 illustrates a method similar to FIG. 3, and equivalent features are given the same reference number.

The turbine simulator 40 generates three reference 50-year return load values, each associated with a different maximum thrust limit. These reference 50-year return load values are referred to as A, B and C in FIG. 4. The measured maximum blade load values 50 are used to obtain an estimated 50-year return load value which is labelled A1 in FIG. 4.

The estimated 50-year return load value A1 is compared with the reference 50-year return load values A, B, C by calculating associated ratios: (A1)/(A*safety factor); (A1)/(B*safety factor); and (A1)/(C*safety factor). The safety factor is a coefficient such as 1.2 or 1.35. If the ratio is less than one then the maximum thrust limit may be increased; and if the ratio is greater than one then the maximum thrust limit may be decreased.

Optionally the safety factor may be changed by recalibration by considering siting uncertainties, measurement uncertainties and so on.

In the examples given above, the maximum load values 50 and the estimated 50-year return load value A1 are indicative of moments acting on a blade 6 of the rotor in a flap-wise direction. In other embodiments of the invention, the maximum load values 50 and/or the estimated 50-year return load value A1 may be indicative of maximum loads acting on a different component of the wind turbine.

Similarly, the reference 50-year return load value 53, A/B/C is indicative of a moment acting on a blade 6 of the rotor in a flap-wise direction. In other embodiments of the invention, the reference 50-year return load value 53, A/B/C may be indicative of a load acting on a different component of the wind turbine.

In the example above, 50-year return loads are compared in step 52. In other embodiments of the invention, different extreme load values may be calculated by statistical analysis and then compared with each other. For example, the measured maximum blade load values 50 may be extrapolated to establish a distribution of estimated maximum blade load values over a future period (for example 50 years) and the 90th-percentile load value compared with an equivalent 90th-percentile load value obtained by the turbine simulator 40.

Although the invention has been described above with reference to one or more preferred embodiments, it will be appreciated that various changes or modifications may be made without departing from the scope of the invention as defined in the appended claims.

The invention claimed is:

1. A method of operating a wind turbine having a rotor, the method comprising:
    receiving sensor data from one or more sensors of the wind turbine;
    obtaining, based on the sensor data, maximum load values that are indicative of maximum loads acting on a component of the wind turbine;
    obtaining an estimated extreme load value based on the maximum load values, wherein the estimated extreme load value is a return load value indicative of a load with an estimated return period of a given duration;
    setting a maximum thrust limit based on a comparison of the estimated extreme load value with a reference value; and
    operating the wind turbine such that a wind thrust force acting on the rotor does not exceed the maximum thrust limit.

2. The method according to claim 1,
    wherein the component of the wind turbine is a blade of the rotor, and
    wherein the maximum load values are indicative of maximum forces or moments acting on the blade of the rotor in a flap-wise direction.

3. The method according to claim 1,
    wherein the component of the wind turbine is a blade of the rotor, and
    wherein the estimated extreme load value is indicative of an estimated force or moment acting on the blade of the rotor in a flap-wise direction.

4. The method according to claim 1, wherein the estimated extreme load value is indicative of an estimated extreme load acting on the component of the wind turbine.

5. The method according to claim 1, wherein the estimated extreme load value is obtained by a statistical analysis of the maximum load values.

6. The method according to claim 1, wherein the given duration is 50 years, and the estimated extreme load value is a 50-year return load value.

7. The method according to claim 1, further comprising obtaining the reference value by simulation.

8. The method according to claim 1,
    wherein comparing the estimated extreme load value with the reference value comprises obtaining a ratio between the estimated extreme load value and the reference value, and
    wherein setting the maximum thrust limit is based on the ratio.

9. The method according to claim 1, wherein each of the maximum load values is indicative of an instantaneous magnitude of a force or moment.

10. The method according to claim 1, wherein each of the maximum load values is indicative of a highest load acting on the component of the wind turbine during a respective interval.

11. The method according to claim 1, wherein operating the wind turbine such that the wind thrust force acting on the rotor does not exceed the maximum thrust limit comprises:
    adjusting a pitch angle of one or more blades of the rotor.

12. The method according to claim 1, further comprising:
    calculating the maximum thrust limit based on a wind speed and a blade load standard deviation.

13. The method according to claim 1, further comprising:
    estimating the wind thrust force based on a wind speed, a blade pitch angle, and a rotational speed of the rotor or of a generator.

14. The method according to claim 1, wherein the estimated extreme load value is indicative of an estimated extreme load acting on another component of the wind turbine.

15. The method according to claim 14,
wherein the maximum load values are blade load values, and
wherein the estimated extreme load value is a thrust force value indicative of a wind thrust force acting on the rotor or on a tower carrying a rotor-nacelle assembly.

16. A wind turbine comprising:
a rotor;
one or more sensors; and
a control system configured to:
obtain, based on sensor data received from the one or more sensors, maximum load values that are indicative of maximum loads acting on a component of the wind turbine;
obtain an estimated extreme load value based on the maximum load values, wherein the estimated extreme load value is a return load value indicative of a load with an estimated return period of a given duration;
set a maximum thrust limit based on a comparison of the estimated extreme load value with a reference value; and
operate the wind turbine such that a wind thrust force acting on the rotor does not exceed the maximum thrust limit.

17. The method according to claim 1, wherein the estimated extreme load value is indicative of an instantaneous magnitude of a force or moment.

18. A control system of a wind turbine, the control system configured to perform an operation comprising:
receiving sensor data from one or more sensors of the wind turbine;
obtaining, based on the sensor data, maximum load values that are indicative of maximum loads acting on a component of the wind turbine;
obtaining an estimated extreme load value based on the maximum load values, wherein the estimated extreme load value is a return load value indicative of a load with an estimated return period of a given duration;
setting a maximum thrust limit based on a comparison of the estimated extreme load value with a reference value; and
operating the wind turbine such that a wind thrust force acting on a rotor of the wind turbine does not exceed the maximum thrust limit.

19. The wind turbine of claim 16, wherein the component of the wind turbine is a blade of the rotor.

20. The wind turbine of claim 19, wherein operating the wind turbine such that the wind thrust force acting on the rotor does not exceed the maximum thrust limit comprises:
adjusting a pitch angle of one or more blades of the rotor.

* * * * *